United States Patent
Dunipace

(10) Patent No.: US 9,106,149 B2
(45) Date of Patent: Aug. 11, 2015

(54) START-UP CIRCUITRY

(71) Applicant: Fairchild Semiconductor Corporation, San Jose, CA (US)

(72) Inventor: Richard A. Dunipace, Highland Village, TX (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/730,042

(22) Filed: Dec. 28, 2012

(65) Prior Publication Data

US 2014/0184285 A1 Jul. 3, 2014

(51) Int. Cl.
  *H03K 17/04* (2006.01)
  *H02M 1/36* (2007.01)

(52) U.S. Cl.
  CPC ........................... *H02M 1/36* (2013.01)

(58) Field of Classification Search
  USPC ............... 327/142, 143, 374, 376, 377, 544; 323/238, 321, 901
  See application file for complete search history.

(56) References Cited

U.S. PATENT DOCUMENTS 7,304,460 B2 * 12/2007 Park ............................... 323/282
2009/0295228 A1 * 12/2009 Ochi ............................... 307/66

* cited by examiner

*Primary Examiner* — Long Nguyen
(74) *Attorney, Agent, or Firm* — Grossman Tucker Perreault & Pfleger PLLC

(57) ABSTRACT

One embodiment provides a start-up circuit that includes start-up switch circuitry comprising a switch coupled an input voltage rail and configured to generate a start-up voltage; wherein the start-up switch circuitry is configured to generate the start-up voltage to have a predefined voltage level within a predetermined time period. The start-up circuit also includes first controller circuitry configured to control the switch to turn ON and OFF based on, at least in part, the start-up voltage; and wherein when the switch is turned ON the start-up switch circuitry generates the start-up voltage and when the switch is turned OFF the start-up circuitry discontinues the start-up voltage.

12 Claims, 3 Drawing Sheets

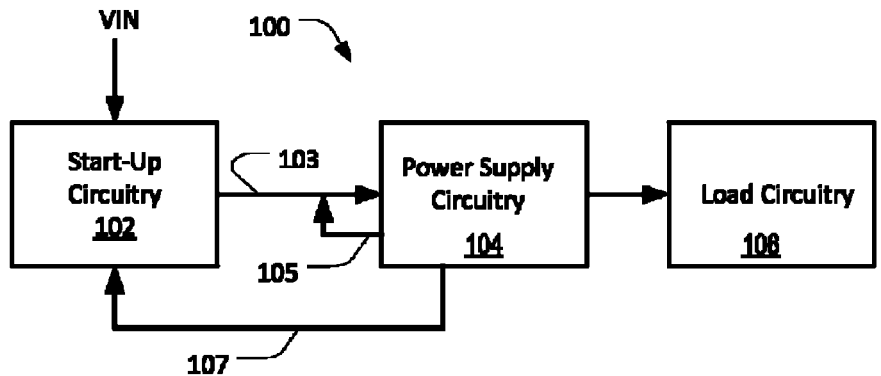
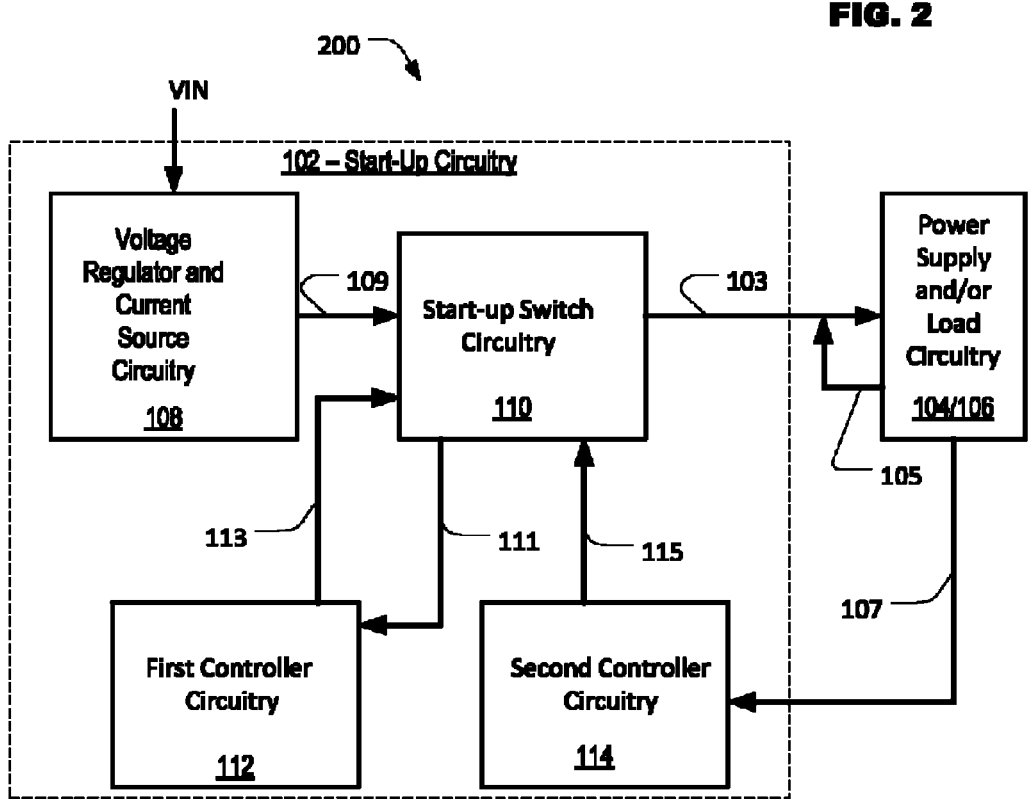

START-UP CIRCUITRY

FIELD

The present disclosure relates to start-up circuit topologies.

BACKGROUND

Many systems require a start-up power supply (e.g. Vcc) that is derived from another voltage source, for example, a high voltage rail, power supply rail, etc. However, conventional approaches to generating a start-up power supply suffer from slow turn on time and large standby power requirements. In addition, conventional approaches do not offer sufficient switch protection in the event of a failure.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 1 illustrates a power supply system consistent with various embodiments of the present disclosure;

FIG. 2 illustrates a block diagram of the start-up circuitry consistent with various embodiments of the present disclosure;

Figure 3:
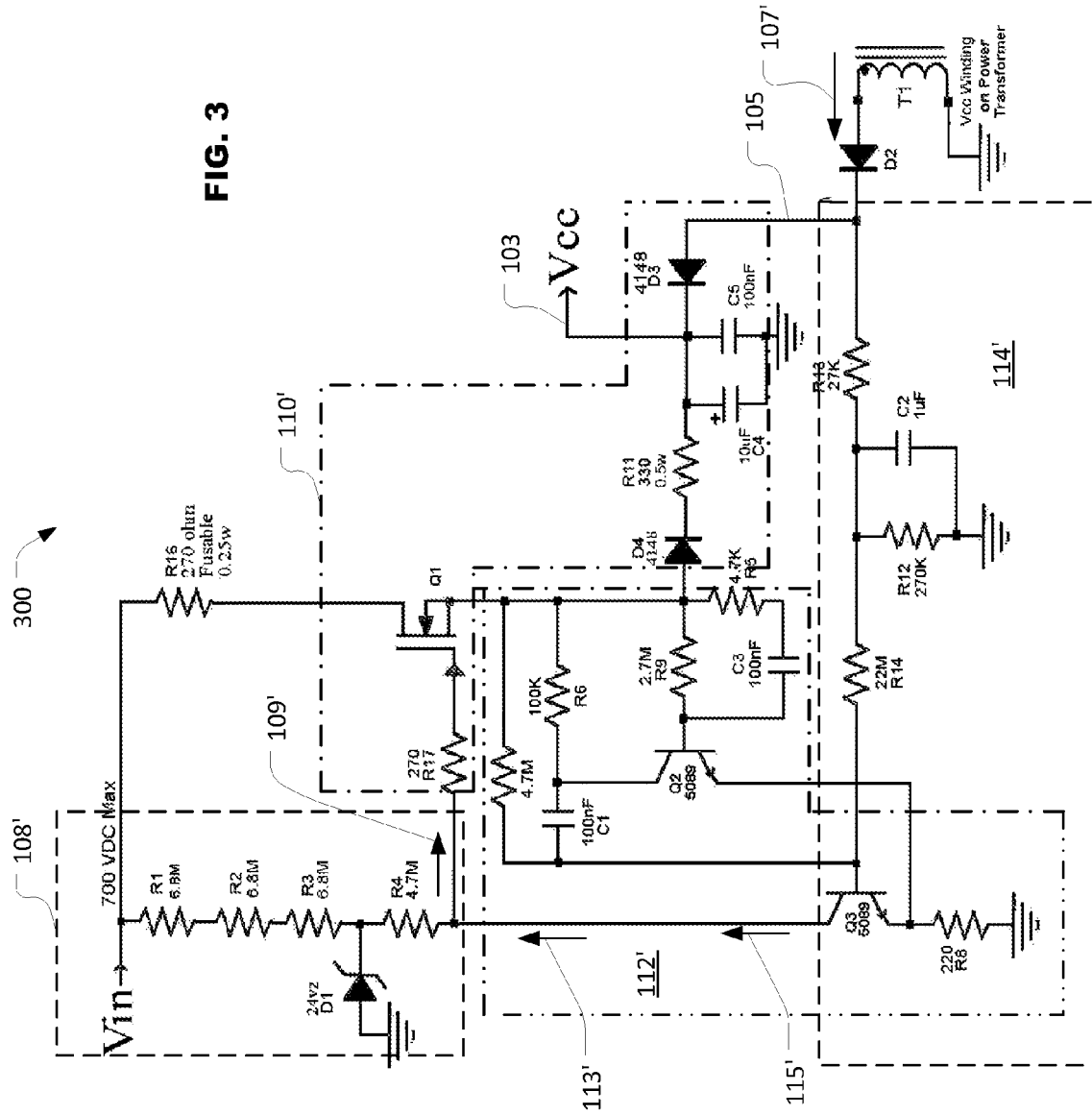
FIG. 3 illustrates a circuit diagram of start-up circuitry consistent with one embodiment of the present disclosure.

Although the following Detailed Description will proceed with reference being made to illustrative embodiments, many alternatives, modifications, and variations thereof will be apparent to those skilled in the art.

DETAILED DESCRIPTION

FIG. 1 illustrates a power supply system 100 consistent with various embodiments of the present disclosure. The power supply system 100 includes start-up circuitry 102, power supply circuitry 104 and load circuitry 106. The start-up circuitry 102 is configured to generate a start-up power supply 103 (e.g., Vcc) from a power rail, Vin. The start-up power supply 103 may be used to provide initial, or start-up, power to various components of the power supply circuitry 104. In some embodiments, the power rail Vin may be a high voltage power rail and the start-up power supply 103 may be at least an order of magnitude smaller than the Vin rail. For example, the Vin rail may be several hundred to several thousand Volts, while the start-up power supply 103 may be less than 20 Volts. In other embodiments, the power rail Vin may have a voltage that is only slightly higher than a desired voltage of the start-up power supply 103. Vin may also be any voltage that exceeds the start-up power supply 103 by several volts, e.g., Vin may be a steady DC value or varying from 0 to Vin as might be used by a PFC (Power Factor Controller) based power supply. The power supply circuitry 104 may include known and/or custom power supply topologies, which may include, for example, a DC/DC converter (e.g., Buck, Boost, Buck/Boost, SEPIC, flyback, etc.), a DC/AC inverter (e.g., Class D, Full Bridge, Half Bridge, etc.), an AC/DC converter (e.g., rectifier, etc.) and/or any known or after-developed power supply topology that requires a start-up voltage supply. Of course, the power supply circuitry 104 is configured to supply power to load circuitry 106 coupled thereto.

The power supply circuitry 104 of these embodiments is generally configured to provide a self-generated power supply 105 once the power supply circuitry 104 has been initiated and is operating properly to supply power to the load circuitry 106. In addition, once the self-generated power supply 105 is enabled, the start-up circuitry 102 is configured to discontinue the start-up power supply 103, based on, for example, a feedback signal 107 from the power supply circuitry 104 and/or the load circuitry 106. As will be explained in greater detail below, the start-up circuitry 102 is configured to generate the start-up power supply 103 for a limited time period to prevent excessive power loss from the power rail, and to protect the start-up circuitry 102, and/or portions thereof, from failure due to, for example, a high voltage environment (if the power rail Vin is a high voltage rail). In addition, the start-up circuitry 102 is configured to generate the initial start-up voltage 103 in a relatively short time period (such time period may, in some embodiments, be on the order of a few milliseconds) to initiate the power supply circuitry 104. In addition, the start-up circuitry 102 is configured to decouple, in whole or in part, from the power supply circuitry 104 with relatively low stand by power (such standby power may, in some embodiments, be on the order of a few milliwatts).

FIG. 2 illustrates a block diagram 200 of the start-up circuitry 102 consistent with various embodiments of the present disclosure. The start-up circuitry 102 generally includes voltage regulator and current source circuitry 108 configured to generate a first switch control signal 109 from the Vin rail. The first switch control signal 109 is a controlled voltage that has a voltage value less than Vin (e.g., signal 109 may be around 20 Volts). Start-up switch circuitry 110 is configured to generate the start-up power supply 103 based on, at least in part, the switch control signal 109. The voltage regulator and current source circuitry 108 is further configured to limit the voltage output of the start-up switch circuitry 110 to a level near (or approximate) to the start-up power supply 103.

To prevent prolonged, and potentially damaging, power dissipation through the start-up switch circuitry 110, the start-up circuitry 102 may also include first controller circuitry 112 configured to control the ON time and/or the OFF time of the start-up switch circuitry 110, thus controlling how long the start-up switch circuitry 110 generates the start-up power supply 103. To that end, the first controller circuitry 112 is configured to receive a feedback signal 111 indicative of the state of the start-up switch circuitry 110, and in response to the feedback signal 111 the first controller circuitry 112 is configured to generate a second switch control signal 113 to control the conduction state of the start-up switch circuitry 110, and thus, control the ON time and/or OFF time of the start-up voltage 103. In some embodiments, the first controller circuitry 112 is configured to control the start-up switch circuitry 110 so that the ON time of the start-up voltage 103 is at least long enough to ensure that the power supply circuitry 104 is enabled and capable of generating the self-generated power supply 105 (such a time period may be specified by, for example, power supply manufacturers and/or desired start-up time), i.e., so that the start-up voltage 103 does not "time out" before the power supply circuitry 104 is properly initiated. In addition, the first controller circuitry 112 is configured to control the start-up switch circuitry 110 so that the OFF time of the start-up startup switch circuitry 110 is sufficient to prevent excessive power loss and to protect the start-up startup switch circuitry 110 in the event of a failure at the power supply circuitry 104, the load circuitry 106, or both.

To provide low standby power, the fast start-up circuitry 102 may also include second controller circuitry 114 configured to decouple the start-up switch circuitry 110 from the voltage rail Vin, and to provide a low power path for the voltage regulator and current source circuitry 108 so that the start-up circuit 102 is optimized to provide very low stand by power (e.g., a few milliwatts or less). To that end, the second controller circuitry 114 is configured to receive the feedback signal 107 from the power supply circuitry 104 and/or the load circuitry 106. The feedback signal 107 may be indicative of the operational state of the power supply circuitry 104 and/or the load circuitry 106, which may include, for example, information that indicates that the power supply circuitry 104 and/or the load circuitry 106 is operating properly, or has failed to initiate and is not operating properly. In addition, the second controller circuitry 114 is configured to generate a third switch control signal 115, based on, at least in part, the feedback signal 107, to control the conduction state of the start-up switch circuitry 110, and thus, control the ON time and/or OFF time of the start-up voltage 103. These and other features of the present disclosure will be described in greater detail below in the context of various circuit embodiments. FIG. 3 illustrates a circuit diagram of start-up circuitry 300 consistent with one embodiment of the present disclosure. It should be noted at the outset that the circuit diagram of FIG. 3 includes specific values for certain circuit components. These values should be taken as non-limiting examples only, and these circuit values may be changed for different environments and/or different performance or operational parameters according to the examples and teachings set forth herein. In the example of FIG. 3, it is assumed that the input voltage rail, Vin, is approximately 700 Volts DC maximum, and that the desired start-up voltage (Vcc) is around 12 Volts, and that the start-up circuit is utilized to generate a start-up voltage 103 for an inductive DC/DC converter power supply (e.g., Buck converter, etc.). For ease of understanding, certain reference numerals from the example of FIG. 2 are repeated in FIG. 3. In the example embodiment of FIG. 3, the voltage regulator and current source circuitry 108' includes a resistor block (R1, R2 and R3) coupled to the voltage rail Vin. Zener diode D1 is coupled to the resistor block and configured to operate as a voltage regulator that clamps the voltage to a level specified by the characteristics of the device, e.g., around 24 volts in this example. Resistor R4 is coupled to the diode D1 and configured to operate as a current source. R1-R4 and D1 are configured to generate the first switch control signal 109' to control the state of the start-up switch circuitry 110' (described below). The resistive values of R1-R4 may be selected to produce a significant voltage drop from Vin, and to produce a very small operating current (e.g., on the order of microAmps). The start-up switch circuitry 110' of this embodiment includes pass through switch Q1 and start-up voltage generating circuitry that includes diode D4, resistor R11 and capacitors C4 and C5. The pass through switch Q1 is coupled to the Vin rail and to the start-up voltage generating circuitry, and the conduction state of the pass through switch Q1 is controlled, at least in part, by the first switch control signal 109'. The source of Q1 is coupled to the blocking diode D4 in forward bias, to resistor R11 and to parallel capacitors C4 and C5. The time constant of the combination of R11 and C4/C5 may be selected to produce the start-up voltage 103 in a predetermined time period. In other words, R11, C4/C5 may be selected to provide a relatively short ramp up time for the start-up voltage 103. Power supply circuitry 104 is coupled to the start-up power supply 103, as shown in FIG. 2. This embodiment also includes fuse circuitry, shown as R16 coupled between Vin and Q1 and configured to break if current delivered by Vin through Q1 exceeds a threshold.

The first controller circuitry 112' of this embodiment essentially operates as an oscillator circuit to control the ON and OFF time of Q1. In this example, the first controller circuitry 112' includes a first oscillator switch Q2 having a base coupled to the source of Q1 and a second oscillator switch Q3 having a base coupled to the collector of Q2. This embodiment also includes a first delay circuit that includes R9 and C3 coupled between the base of Q2 and the source of Q1 (as shown), and a second delay circuit that includes R4.7M and C1 coupled between the collector of Q2 and the base of Q3 (as shown). The time constant of the first delay circuit primarily controls the OFF time of Q1, while the second delay primarily controls the ON time of Q1. Typically, the ON time of Q1 is adjusted to be smaller than the OFF time to limit the power dissipation of Q1. The first controller circuitry 112' is configured to generate the second switch control signal 113' to control the conduction state of Q1, as will be explained in greater detail below.

The second controller circuitry 114' of this embodiment includes the second switch Q3, a first delay circuit that includes resistor R13 and capacitor C2 and a second delay circuit that includes resistor R12 and capacitor C2. The first and second delay circuits are coupled to the base of Q3 to control the conduction state of Q3, as shown. In this example, the first and second delay circuits are coupled to a transformer T1 of the power supply circuitry 104 (not shown in this figure). The feedback signal 107' is indicative of the power delivered from transformer winding T1 by the power supply circuitry 104. The second controller circuitry 114' is configured to generate the third switch control signal 115' to control the conduction state of Q1, as will be explained in greater detail below.

Resistor R16 is used to reduce the voltage across Q1 to improve the FBSOA. It can also be used in conjunction with a capacitor to ground (not shown) at the drain of Q1 to form a network to limit dv/dt to protect Q1 from possible transients in Vin that might destroy Q1. Resistor R16 may also act as a fuse in the event that any element of the start-up circuit 300 fails and causes the Vin voltage to be applied to the circuit output without limit. Resistor R17 acts as part of a damping network in association with the input capacitance of Q1 to stop any parasitic oscillations of Q1. Resistor R14 converts the voltage on R12 into a current to drive Q3. Resistor R5 limits the charging current of capacitor C3. Resistor R8 allows the emitters of Q2 and Q3 to be coupled electrically. Resistor R6 provides collector load and bias for BJT Q2.

Normal and Low Power Standby Operations

With continued reference to the example of FIG. 3, the following describes the operation of various parts of the circuit example 300 when the start-up voltage 103 is generated and the power supply circuitry 104 (coupled to the start-up voltage, not shown in this figure) is initiated and is operating normally. The Vin rail voltage is applied to the voltage regulator and current source circuitry 108' which generates the first switch control signal 109'. The first switch control signal 109' turns ON the pass through switch Q1 if the voltage at the output (source) of Q1 is at least 2-3 volts lower than the control signal 109' If Q1 turns ON, C4/C5 begin to charge and the Vcc voltage 103 begins to ramp up due to the current supplied from the output of Q1 through diode D4 and resistor R11. The value of the voltage from Q1 is limited by the voltage regulator D1/R1-R3, diode D4, and the turn on threshold voltage of Q1. Once the start-up voltage 103 has reached a predefined level, the power supply circuitry 104

(coupled to 103) is enabled and begins to deliver power to load circuitry coupled thereto through transformer T1. The feedback signal 107' (which, in this example, is a Vcc winding tap on transformer T1) is indicative of the operation state of the power supply circuitry. In other words, when the transformer T1 begins to deliver power to the load circuitry, the feedback signal 107' is at predefined voltage level. The feedback signal 107' charges the first delay circuit of R13/C2. After a predetermined delay period, the charge on the first delay circuit is sufficient to turn ON switch Q3. When Q3 turns ON, a path is created from the voltage regulator and current source circuitry 108' to ground (or reference) through resistor R8. When Q3 turns ON, the second switch control signal 115' is generated which turns Q1 OFF. Thus, the second switch control signal 115', in this embodiment, overrides the first switch control signal 109' to turn switch Q1 OFF.

If there is a lapse of power from transformer T1 (e.g., a transformer short, etc.), the second delay circuit of R12 and C2 will begin to discharge. After a predetermined delay period, Q3 will turn OFF, thus turning Q1 back ON to deliver the start-up voltage 103 again until R13/C2 charges enough to turn Q3 back ON (as described above). When T1 is operating normally, the self-generated power supply 105 may be used to provide power to the power supply circuitry via blocking diodes D2 and D3. The value of resistors R1-R4 are selected so that when Q3 is ON (low power standby), the power draw is minimized to a few microAmps (i.e., 700V/(R1+R2+R3+R4)=low standby power; where R8 has a negligible effect). In this example, the time constant of R11/C4/C5 is selected so that the start-up voltage ramps up to a sufficient level to provide power to the power supply circuitry 104 (not shown in this figure) within a few milliseconds (e.g., 3-10 milliseconds). The time constant of the first delay circuit R13/C2 is selected to allow the power supply circuitry 104 to sufficiently settle to normal operation before switch Q3 is turned ON. The time constant of the second delay circuit R12/C2 is selected to allow for momentary lapses of power at the transformer T1 without turning Q3 OFF (and thus Q1 ON), so that minor, normal operating variations of the power supply circuitry and/or the load circuitry do not immediately restart the start-up voltage 103.

Failure State and Circuit Protection Operations

With continued reference to the example of FIG. 3, the following describes the operation of various parts of the circuit example 300 when the start-up voltage 103 fails to start the power supply circuitry 104 (coupled to the Vcc start-up voltage 103, not shown in this figure). The voltage regulator and current source circuitry 108' generates the first switch control signal 109' to turn ON Q1, as described above. When Q1 turns ON, Q2 of the first controller circuitry 112' also turns ON. In addition, the second delay circuit of R4.7M and C1 begins to charge. When the charge of the second delay circuit is sufficient, the second delay circuit causes Q3 to turn ON, thus turning OFF Q1 (and Q2). The time constant of the second delay circuit of R4.7M and C1, therefore, may be selected so that so that the start-up voltage 103 is provided for a sufficient time period to enable the power supply circuitry 104 to initiate and turn on. Absent feedback information from T1 (described above), Q3 will remain ON until the first delay circuit (C3/R9) and the second delay circuit (R4.7M/C1) discharge to below the turn on voltage of Q3. C3 holds Q2 OFF until C3 can discharge through R9 and through the base-emitter junction of Q2 (in reverse bias), thus generating a negative current through Q2. This negative current generates a negative voltage across R8 which keeps voltage on the emitter of Q3 less than the voltage on the base of Q3 (which keeps Q3 ON until C3 is discharged). Once C3 (and C1) have discharged sufficiently, Q3 turns OFF and Q1 (and Q2) turns ON. This process (oscillation) is repeated until the start-up voltage 103 starts the power supply circuit operating normally (described above). By turning OFF Q1 at defined intervals, the first controller circuitry 112' operates to protect Q1 from FBSOA (forward bias safe operating area) failure, and also, limits the power draw of the circuit topology.

Figure 4:
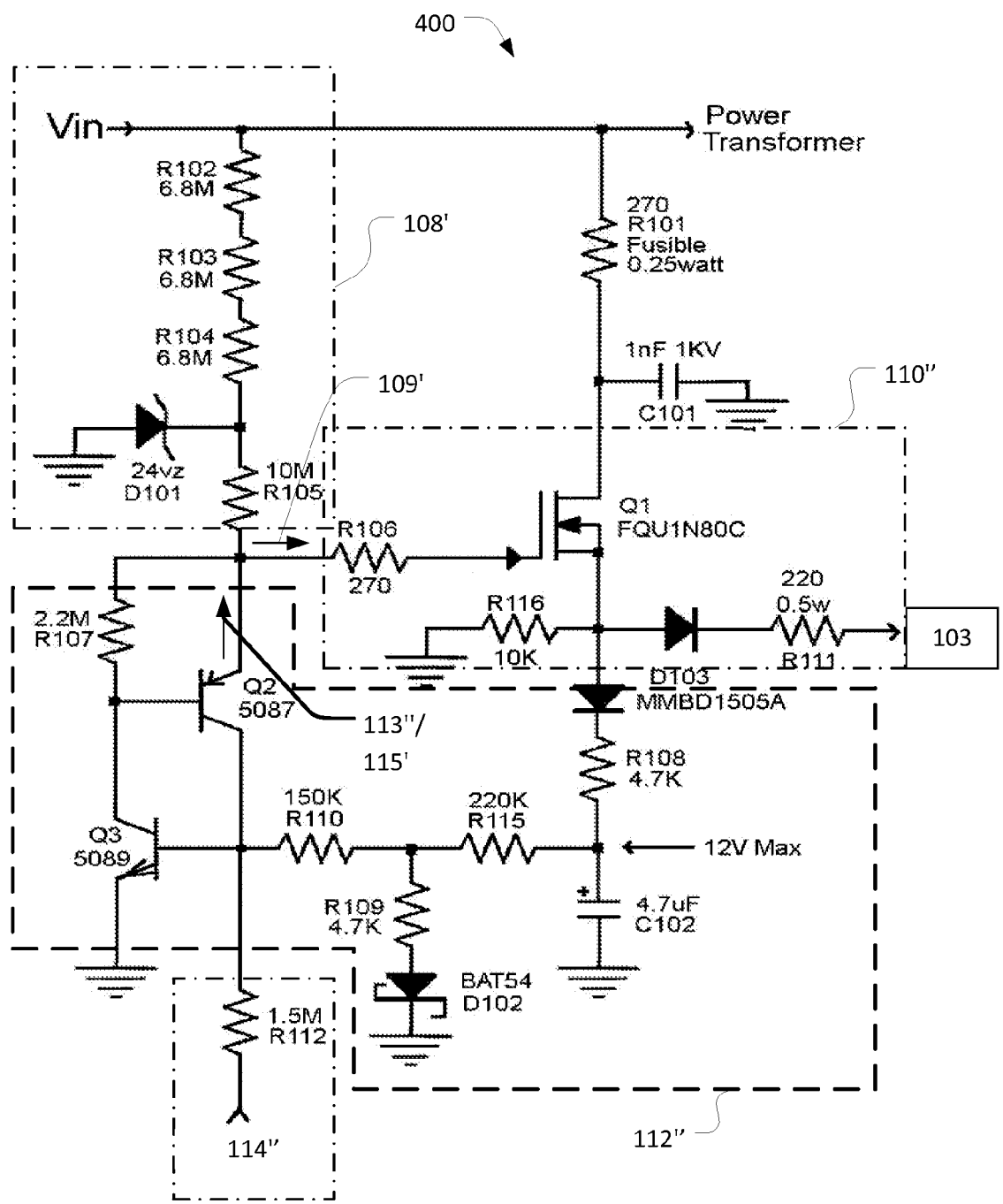
FIG. 4 illustrates a circuit diagram of start-up circuitry consistent with another embodiment of the present disclosure.

FIG. 4 illustrates a circuit diagram of start-up circuitry 400 consistent with another embodiment of the present disclosure. Similar to the previous embodiment of FIG. 3, the circuit diagram of FIG. 4 includes specific values for certain circuit components. These values should be taken as non-limiting examples only, and these circuit values may be changed for different environments and/or different performance or operational parameters according to the examples and teachings set forth herein. In the example of FIG. 4, it is assumed that the input voltage rail, Vin, is approximately 700 Volts DC maximum, and that the desired start-up voltage (Vcc) is around 12 Volts, and that the start-up circuit is utilized to generate a start-up voltage 103 for an DC/DC converter power supply (e.g., Buck converter, etc.). For ease of understanding, certain reference numerals from the example of FIG. 3 are repeated in FIG. 4, and to the extent such reference numerals are repeated, it should be assumed that the operation and configuration of such reference numerals is similar to that described above with reference to FIG. 3.

In this example, the voltage regulator and current source circuitry 108' is repeated from FIG. 3, and configured to generate the first switch control signal 109' as described above. The start-up switch circuitry 110" is similar to the start-up switch circuitry 110' shown in FIG. 3, however, the C4/C5 capacitor circuitry is not shown (but may be included) in the example of FIG. 4. Resistor R116 provides an output load for Q1 so that the source of Q1 is near zero volts when Q1 is OFF. Diode D103 decouples Q1 from voltage 103 and the timing capacitor C102 when Q1 is OFF. The first controller circuitry 112" of this embodiment essentially operates as an oscillator circuit to control the ON and OFF time of Q1. In this example, the first controller circuitry 112" includes a first oscillator switch Q2 having an emitter coupled to the gate of Q1 and a second oscillator switch Q3 having a base coupled to the collector of Q2. This embodiment also includes a first delay circuit that includes R108 and C102 coupled between the base of Q3 (and the collector of Q2) and the source of Q1 (as shown), and a second delay circuit that includes R115 and C102 coupled between the base of Q3 (and the collector of Q2) and the source of Q1 (as shown). The time constant of the first delay circuit primarily controls the ON time of Q1, while the time constant of the second delay circuit primarily controls the OFF time of Q1. Typically, the ON time of Q1 is adjusted to be smaller than the OFF time to limit the power dissipation of Q1. The first controller circuitry 112" is configured to generate the second switch control signal 113" to control the conduction state of Q1, as will be explained in greater detail below. The second controller circuitry 114' is coupled to the base of Q3 (and the collector of Q2) and is configured to generate the third control signal 115', as described above, to provide low power stand by operations.

With continued reference to the example of FIG. 4, the following describes the operation of various parts of the circuit example 400 when the start-up voltage 103 fails to start the power supply circuitry 104 (coupled to the start-up voltage, not shown in this figure). The voltage regulator and current source circuitry 108' generates the first switch control signal 109' to turn ON Q1, as described above. When Q1 turns ON, C102 (first delay circuit C102/R108) begins to charge. When C102 has charged to a sufficient level, Q3 of the first controller circuitry 112'' turns ON. When Q3 turns ON, Q2 is turned ON, and as a result, the positive feedback arrangement between Q3 and Q2 keeps these switches ON. When Q3 turns ON, Q1 turns OFF. The second delay circuit of C102 and R115 keep Q3 ON for a specified time period (thus keeping Q1 OFF for the specified time period. Once C102 has discharged sufficiently, Q3 (and Q2) turns OFF and Q1 turns back ON. The time constant of the first delay circuit of R108 and C102, therefore, may be selected so that so that the start-up voltage 103 is provided for a sufficient time period to enable the power supply circuitry 104 to initiate and turn on. Absent feedback information from T1 (described above), Q3 will remain ON until the first the second delay circuit discharges to below the turn on voltage of Q3. This process (oscillation) is repeated until the start-up voltage 103 starts the power supply circuit operating normally (described above). By turning OFF Q1 at defined intervals, the first controller circuitry 112'' operates to protect Q1 from FBSOA (forward bias safe operating area) failure, and also, limits the power draw of the circuit topology.

Resistor R110 converts the voltage on resistor R109 to a current to drive the base of Q3. Resistors R108 and R109 form a voltage divider to set the switching voltage across capacitor C102. Resistor R107 sets the current from Q3 at which Q2 turns ON. Resistor R112 converts the voltage at 114 to a current to drive the base of Q3.

In any of the previous embodiments, the signal 107 may be derived from a variety of sources from the power supply circuitry 104 and/or the load circuitry 106. In the examples provided, the output transformer is described to generate the feedback signal 107. However, in other embodiments, the feedback signal may be derived from any portion of the power supply circuitry 104 and/or the load circuitry 106 as an indication that the power supply circuitry 104 and/or the load circuitry 106 is operating properly. For example, instead of using the output transformer to generate the feedback signal 107, a similar signal may generated by a pulse width modulation (PWM) controller associated with the power supply circuitry 104, from a power switch associated with the power supply circuitry 104, etc. In addition, the start-up circuitry of any of the embodiments described herein may be modified to include one or more stacked stages to provide higher breakdown voltages, which may be useful in high voltage environments. For example, referring to the circuit example of FIG. 3, in some embodiments the resistors R1-R3, R17 and switch Q1 may be repeated to provide higher voltage breakdown of Vin.

The terms "circuitry" or "circuit", as used in any embodiment herein, may comprise, for example, singly or in any combination, hardwired circuitry, programmable circuitry, state machine circuitry, and/or circuitry available in a larger system, for example, discrete elements that may be included as part of an integrated circuit. Thus, "circuit" or "circuitry" may be formed using analog, digital, or mixed-signal structures, which may also include software/firmware components. In addition, any of the switch devices described herein may include any type of known or after-developed switch circuitry such as, for example, MOS transistor, BJT, SiC, IGBT, etc.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A start-up circuit, comprising:
    voltage regulator and current source circuitry coupled to an input voltage rail, and configured to generate a first switch control signal having a voltage less than the input voltage rail;
    start-up switch circuitry comprising a switch coupled to the input voltage rail, and configured to generate a start-up voltage having a predefined voltage level within a predetermined time period based on, at least in part, the first switch control signal, generate a first feedback signal indicative of the state of the start-up switch circuitry, wherein when the switch is turned ON the start-up switch circuitry generates the start-up voltage and when the switch is turned OFF the start-up circuitry discontinues the start-up voltage; and
    first controller circuitry configured to receive the first feedback signal and generate a second switch control signal to control the conduction state of the switch to turn ON and OFF based on, at least in part, the first feedback signal, wherein the first controller circuitry comprises first delay circuitry coupled to the start-up switch circuitry and configured to control a time period the switch is OFF.

2. The start-up circuit of claim 1, further comprising:
    second controller circuitry configured to receive a second feedback signal indicative of an operational state of at least one of power supply circuitry or load circuitry coupled to the start-up circuit and generate a third switch control signal;
    wherein the third switch control signal controls the conduction state of the switch to turn ON and OFF based on, at least in part, the second feedback signal; and
    wherein when the switch is turned ON the start-up switch circuitry generates the start-up voltage and when the switch is turned OFF the start-up circuitry discontinues the start-up voltage.

3. The start-up circuit of claim 2, wherein the first controller circuitry is configured to generate the second switch control signal so that the ON time of the switch is sufficient to turn on the power supply circuitry coupled to the start-up circuit, and the OFF time is sufficient to prevent power through the switch from exceeding a threshold.

4. The start-up circuit of claim 2, wherein the second controller circuitry is configured to generate the third switch control signal so that the ON time of the switch is sufficient to turn on the power supply circuitry coupled to the start-up circuit, and when the switch is OFF the start-up circuit is in a low power state.

5. The start-up circuit of claim 4, wherein the low power state is a state in which the start-up circuit consumes less than 5 milliwatts.

6. The start-up circuit of claim 1, wherein the predetermined time period is between 0 and 8 milliseconds.

7. A start-up circuit, comprising:
    start-up switch circuitry comprising a switch coupled an input voltage rail and configured to generate a start-up voltage having a predefined voltage level within a predetermined time period;
    first controller circuitry configured to control the switch to turn ON and OFF based on, at least in part, the start-up voltage wherein when the switch is turned ON the start-up switch circuitry generates the start-up voltage and when the switch is turned OFF the start-up switch circuitry discontinues the start-up voltage, wherein the first controller circuitry comprises first delay circuitry coupled to the start-up switch circuitry and configured to control a time period the switch is OFF; and second controller circuitry configured to turn the switch ON and OFF based on, at least in part, a signal indicative of an operational state of circuitry that is external to the start-up circuit.

8. The start-up circuit of claim 7, wherein the external circuitry is at least one of power supply circuitry or load circuitry coupled to the start-up circuit.

9. The start-up circuit of claim 8, wherein the first controller circuitry is configured to control the switch so that the ON time of the switch is sufficient to turn on power supply circuitry coupled to the start-up circuit, and the OFF time is sufficient to prevent power through the switch from exceeding a threshold.

10. The start-up circuit of claim 8, wherein the second controller circuitry is configured to control the switch so that the ON time of the switch is sufficient to turn on the power supply circuitry coupled to the start-up circuit, and when the switch is OFF the start-up circuit is in a low power state.

11. The start-up circuit of claim 10, wherein the low power state is a state in which the start-up circuit consumes less than 5 milliwatts.

12. The start-up circuit of claim 9, wherein the threshold is based on the power requirements of the switch.

\* \* \* \* \*